US009642079B2

(12) United States Patent
Nakano

(10) Patent No.: US 9,642,079 B2
(45) Date of Patent: May 2, 2017

(54) WIRELESS COMMUNICATION DEVICE AND WIRELESS COMMUNICATION CONTROL METHOD

(71) Applicant: MITSUBISHI ELECTRIC CORPORATION, Tokyo (JP)

(72) Inventor: Hisao Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/784,919

(22) PCT Filed: Jul. 16, 2013

(86) PCT No.: PCT/JP2013/069287
§ 371 (c)(1),
(2) Date: Oct. 15, 2015

(87) PCT Pub. No.: WO2015/008328
PCT Pub. Date: Jan. 22, 2015

(65) Prior Publication Data
US 2016/0081015 A1  Mar. 17, 2016

(51) Int. Cl.
*H04W 48/18* (2009.01)
*H04B 1/401* (2015.01)
(Continued)

(52) U.S. Cl.
CPC ............ *H04W 48/18* (2013.01); *H04B 1/401* (2013.01); *H04B 7/10* (2013.01); *H04W 4/008* (2013.01); *H04W 72/1215* (2013.01); *H04W 88/06* (2013.01); *H04W 16/14* (2013.01); *H04W 84/12* (2013.01)

(58) Field of Classification Search
None
See application file for complete search history.

(56) References Cited

U.S. PATENT DOCUMENTS

2004/0192222 A1* 9/2004 Vaisanen ............... H04B 1/44
455/78
2006/0223558 A1* 10/2006 Behzad ............... H04B 1/0082
455/502
(Continued)

FOREIGN PATENT DOCUMENTS

JP  2011-114768 A  6/2011
JP  2011-176538 A  9/2011
(Continued)

*Primary Examiner* — Olumide T Ajibade Akonai
*Assistant Examiner* — Margaret G Mastrodonato
(74) *Attorney, Agent, or Firm* — Birch, Stewart, Kolasch & Birch, LLP

(57) ABSTRACT

A wireless communication device 1 carries out wireless communications using different wireless communication schemes through antennas independent of each other. When it decides that a party on the other end is a wireless communication device using a single antenna system, it switches to a simultaneous operation that carries out wireless LAN and Bluetooth wireless communication in parallel, and when it does not decide that the party on the other end is a wireless communication device using a single antenna system, it switches to a time-division operation that carries out the wireless LAN and Bluetooth wireless communication in time division.

10 Claims, 6 Drawing Sheets

(51) Int. Cl.
*H04B 7/10* (2017.01)
*H04W 4/00* (2009.01)
*H04W 72/12* (2009.01)
*H04W 88/06* (2009.01)
*H04W 16/14* (2009.01)
*H04W 84/12* (2009.01)

(56) References Cited

U.S. PATENT DOCUMENTS

| | | | | |
|---|---|---|---|---|
| 2008/0253345 | A1* | 10/2008 | Sanguinetti | H01Q 1/2291 370/339 |
| 2009/0323652 | A1* | 12/2009 | Chen | H04B 1/406 370/338 |
| 2010/0316027 | A1* | 12/2010 | Rick | H04W 88/06 370/336 |
| 2011/0007675 | A1* | 1/2011 | Chiou | H04B 1/406 370/297 |
| 2011/0249603 | A1* | 10/2011 | Rick | H04B 1/006 370/311 |
| 2012/0276938 | A1* | 11/2012 | Wagholikar | H04W 72/1215 455/514 |

FOREIGN PATENT DOCUMENTS

| | | | |
|---|---|---|---|
| JP | 2012-530472 | A | 11/2012 |
| JP | 2012-530473 | A | 11/2012 |

\* cited by examiner (a)

(b)

WIRELESS COMMUNICATION DEVICE AND WIRELESS COMMUNICATION CONTROL METHOD

TECHNICAL FIELD

The present invention relates to a wireless communication device that carries out communication in different wireless communication schemes using antennas independent of each other, and particularly to a wireless communication device and a wireless communication control method for carrying out wireless communication with a wireless communication device that carries out communication in the different wireless communication schemes using a common antenna.

BACKGROUND ART

Although a portable communication terminal like a smartphone can carry out communication in different wireless communication schemes such as Bluetooth (registered trademark: the mention of which will be omitted below) and a wireless LAN (Local Area Network), it usually uses a common antenna (referred to as a "single antenna system" from now on) in the wireless communication schemes to meet a space-saving demand.

The single antenna system achieves communication through a single antenna while avoiding interference between the wireless communications by carrying out the communications in both the wireless communication schemes in time division.

On the other hand, as for onboard equipment like a car navigation system, since its space-saving demand is not so rigid as a portable communication terminal like a smartphone, it sometimes assigns different antennas to the Bluetooth and wireless LAN (referred to as a "dual antenna system" from now on). Generally, since the dual antenna system can ease restriction on the time-division operation as compared with the single antenna system, it can improve the throughput of the wireless LAN.

For example, Patent Document 1 discloses a technique that carries out priority control or switches between a simultaneous operation and a time-division operation in accordance with a packet state of the wireless LAN and Bluetooth in a wireless communication device that carries out wireless communications using the wireless LAN and Bluetooth.

In addition, Patent Document 2 discloses, in a wireless communication device carrying out wireless communications based on a wireless LAN and Bluetooth, a technique that switches in accordance with a transmission range between a parallel operation (referred to as a "simultaneous operation" from now on) which carries out the respective wireless communications using two antennas, and a time-division operation which uses a single antenna in common.

PRIOR ART DOCUMENT

Patent Document

Patent Document 1: Japanese Translation of PCT Application No. 2012-530472.
Patent Document 2: Japanese Translation of PCT Application No. 2012-530473.

DISCLOSURE OF THE INVENTION

Problems to be Solved by the Invention

When the wireless communication device with the dual antenna system and the wireless communication device with the single antenna system carry out wireless communications using the wireless LAN and Bluetooth, since they carry out communications with each other in the time division, they each try to control the transmission timing of the wireless LAN of the party on the other end.

Thus, they cannot adjust the timing of the time-division operation as when the wireless communication device on one side carries out control, thereby reducing the throughput of the wireless LAN.

Incidentally, since the conventional techniques typified by the Patent Documents 1 and 2 do not consider the communications between the wireless communication devices described above, they cannot solve the foregoing problem.

The present invention is implemented to solve the foregoing problem. Therefore it is an object of the present invention to provide a wireless communication device and a wireless communication control method capable of improving the throughput of the wireless communication.

Means for Solving the Problem

A wireless communication device in accordance with the present invention is a wireless communication device including wireless communicators each carrying out wireless communication using different wireless communication schemes through antennas independent of each other, and comprises: a decider to decide whether or not a party on the other end is a wireless communication device with a single antenna system, which carries out wireless communication in time division using the different wireless communication schemes through a common antenna; and a controller to control the individual wireless communicators, and switches between a simultaneous operation and a time-division operation, the simultaneous operation carrying out wireless communication using the different wireless communication schemes in parallel, and the time-division operation carrying out the wireless communication using the different wireless communication schemes in time division, wherein when the decider decides that the party on the other end is the wireless communication device with the single antenna system, the controller switches to the simultaneous operation by controlling the individual wireless communicators, and when the decider does not decide that the party on the other end is the wireless communication device with the single antenna system, the controller switches to the time-division operation by controlling the individual wireless communicators.

Advantages of the Invention

According to the present invention, it offers an advantage of being able to improve the throughput of the wireless communication.

BEST MODE FOR CARRYING OUT THE INVENTION

The best mode for carrying out the invention will now be described with reference to the accompanying drawings to explain the present invention in more detail.

Embodiment 1

Figure 1:
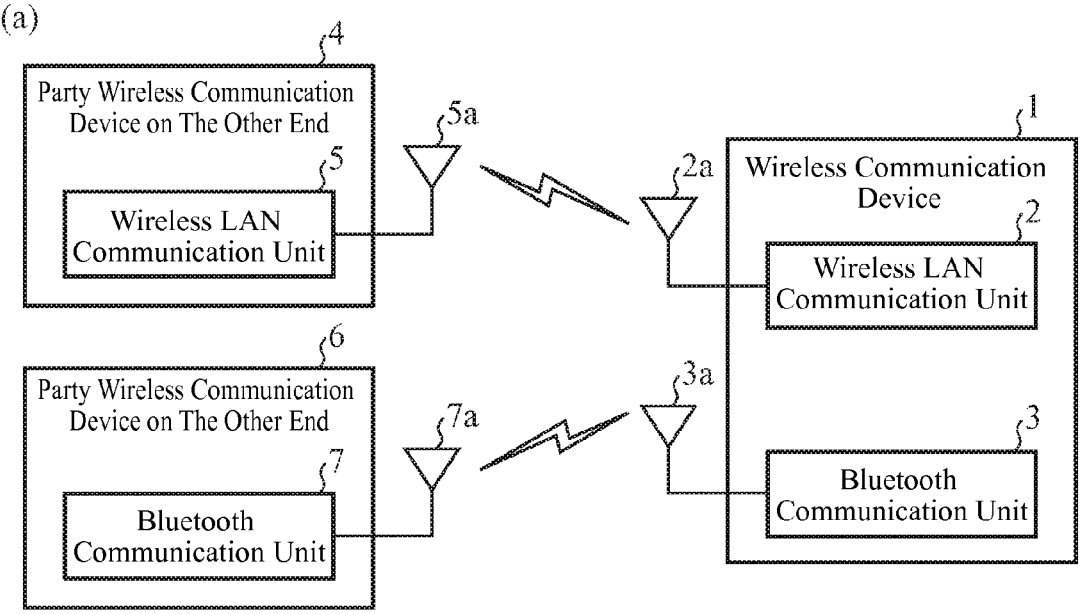
FIGS. 1(a) and 1(b) are diagrams showing an outline of wireless communications the present inventions supposes.
Figure 1:
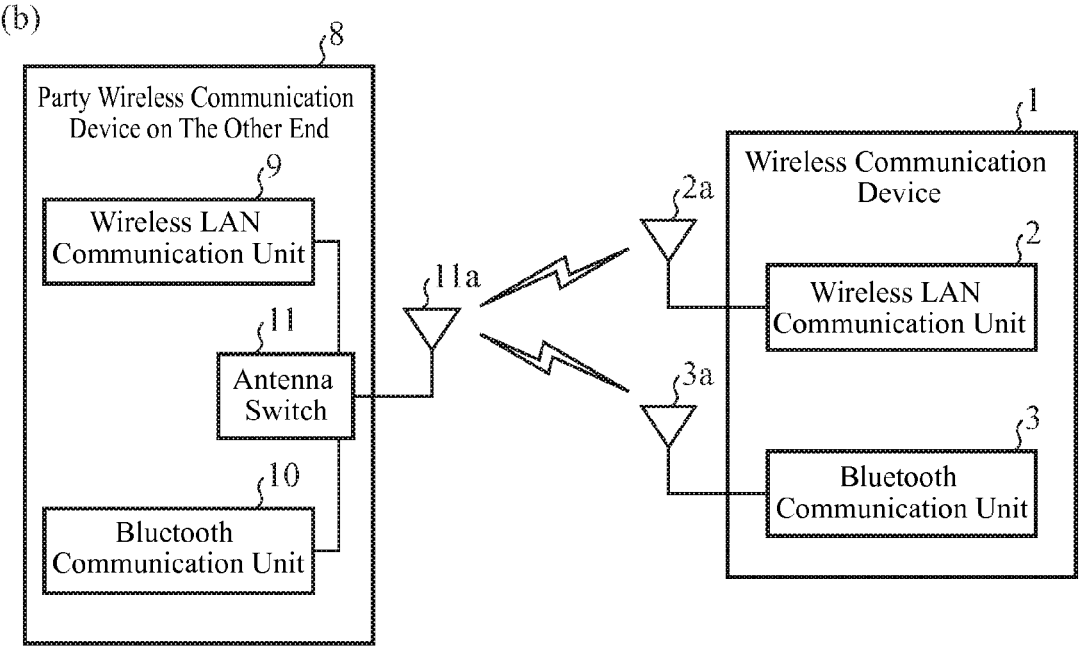

FIG. 1 is a diagram showing an outline of wireless communications the present invention supposes, which shows a case that carries out wireless communications through a wireless LAN and Bluetooth.

In FIG. 1, a wireless communication device 1 in accordance with the present invention comprises a wireless LAN antenna 2a, a Bluetooth antenna 3a, a wireless LAN communication unit 2 and a Bluetooth communication unit 3. In addition, the wireless communication device 1 is able to switch between a simultaneous operation, which carries out the wireless communications through the wireless LAN and Bluetooth in parallel, and a time-division operation, which carries out the wireless communication in time division, by controlling the wireless LAN communication unit 2 and the Bluetooth communication unit 3 and by using the antennas 2a and 3a independent of each other.

As shown in FIG. 1(a), an example will be described in which the individual parties on the other end of the wireless LAN and Bluetooth of the wireless communication device 1 are separate wireless communication devices (wireless communication devices 4 and 6 on the other end).

In the wireless communication device 4 on the other end, a wireless LAN communication unit 5 carries out communication through the wireless LAN using a wireless LAN antenna 5a, and in the wireless communication device 6 on the other end, a Bluetooth communication unit 7 carries out communication through Bluetooth using a Bluetooth antenna 7a.

Incidentally, it is conceivable as the wireless communication device 1 a car navigation system, and as the wireless communication devices 4 and 6 on the other end two smartphones.

In FIG. 1(a), to avoid the interference between both the wireless communications when the isolation between the wireless LAN antenna 2a and the Bluetooth antenna 3a is insufficient in the communications through the wireless LAN and Bluetooth between the wireless communication device 1 and the wireless communication devices 4 and 6 on the other end, the wireless communication device 1 carries out a time-division operation to control the transmitting-receiving timing of the wireless LAN of the wireless communication device 4 on the other end.

On the other hand, in the example shown in FIG. 1(b), the individual parties on the other end of the wireless LAN and Bluetooth of the wireless communication device 1 are a single wireless communication device (party wireless communication device 8 on the other end).

The party wireless communication device 8 on the other end is capable of a time-division operation which carries out wireless communications through the wireless LAN and Bluetooth in time division using a common antenna 11a by controlling a wireless LAN communication unit 9 and a Bluetooth communication unit 10 in response to the switching of an antenna switch 11.

For example, because of a space-saving demand, smartphones with such a single antenna system have been diffused widely.

In FIG. 1(b), the party wireless communication device 8 on the other end carries out communication through the wireless LAN and Bluetooth in time division (time division operation) using the common antenna 11a in response to the switching of the antenna switch 11.

On the other hand, as in FIG. 1(a), when the isolation between the wireless LAN antenna 2a and the Bluetooth antenna 3a is insufficient in the communications through the wireless LAN and Bluetooth with the party wireless communication device 8 on the other end, the wireless communication device 1 tries to control the transmitting-receiving timing of the wireless LAN of the party wireless communication device 8 on the other end by carrying out the time-division operation as described above.

When trying to control the transmitting-receiving timing of the wireless LAN of the parties on the other end each other, they cannot adjust the timing of the time-division operation as in the case where only one wireless communication device controls, thereby reducing the throughput of the wireless LAN.

For this reason, the present invention decides whether the party on the other end is a wireless communication device with a single antenna system or not, carries out a simultaneous operation when it decides that the party on the other end is a wireless communication device with a single antenna system, and carries out a time-division operation when it decides that it is not a wireless communication device with a single antenna system, thereby improving the throughput of the wireless LAN.

Figure 2:
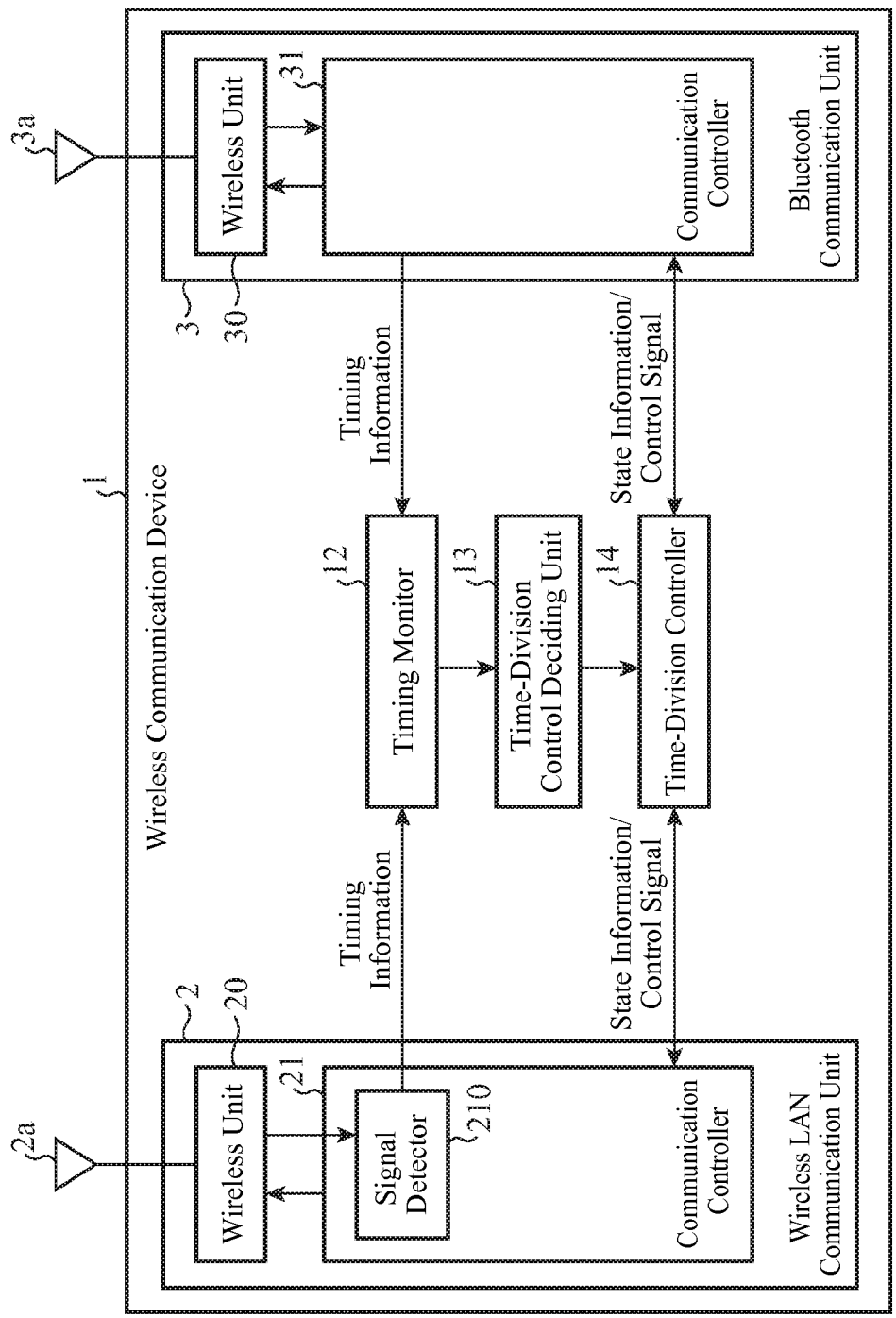
FIG. 2 is a block diagram showing a configuration of a wireless communication device of an embodiment 1 in accordance with the present invention.

FIG. 2 is a block diagram showing a configuration of a wireless communication device of the embodiment 1 in accordance with the present invention. As shown in FIG. 2, the wireless communication device 1, which is a wireless communication device with a dual antenna system having the wireless LAN antenna 2a and Bluetooth antenna 3a, comprises the wireless LAN communication unit 2, the Bluetooth communication unit 3, a timing monitor 12, a time-division control deciding unit 13 and a time-division controller 14.

The wireless LAN communication unit 2, which is a wireless communication unit that carries out communication through the wireless LAN using the wireless LAN antenna 2a, comprises a wireless unit 20 and a communication controller 21.

The wireless unit 20 transmits and receives a wireless LAN signal via the wireless LAN antenna 2a.

The communication controller 21, which is a communication controller that controls communication by the wireless unit 20, outputs to the time-division controller 14 the state information indicating a communication state of the wireless unit 20 or the control signal received from the party on the other end. In addition, the communication controller 21 comprises a signal detector 210.

The signal detector 210 generates timing information indicating the timing at which a wireless LAN packet is received from the party on the other end, and outputs it to the timing monitor 12.

The Bluetooth communication unit 3, which is a wireless communication unit that carries out Bluetooth communication using the Bluetooth antenna 3a, comprises a wireless unit 30 and a communication controller 31.

The wireless unit 30 transmits and receives a Bluetooth signal via the Bluetooth antenna 3a. The communication controller 31, which is a communication controller that controls communication by the wireless unit 30, outputs the state information indicating a communication state of the wireless unit 30 or a control signal received from the party on the other end to the time-division controller 14. In addition, the communication controller 31 generates the timing information indicating the transmitting-receiving timing of a Bluetooth packet, and outputs it to the timing monitor 12.

According to the timing information items received from the wireless LAN communication unit 2 and from the Bluetooth communication unit 3, respectively, the timing monitor 12 monitors the receiving timing of the wireless LAN packet and the transmitting-receiving timing of a Bluetooth packet.

The time-division control deciding unit 13 is a deciding unit that decides whether the party on the other end is a wireless communication device with a single antenna system or not according to a monitoring result by the timing monitor 12. The deciding method will be described later in the embodiments 2 to 5.

The time-division controller 14 is a controller that controls the wireless LAN communication unit 2 and Bluetooth communication unit 3, and switches between the simultaneous operation, which carries out the wireless LAN communication using the wireless LAN antenna 2a and the Bluetooth wireless communication using the Bluetooth antenna 3a in parallel, and the time-division operation which carries out them in time division.

In addition, when the time-division control deciding unit 13 decides that the party on the other end is a wireless communication device with a single antenna system, the time-division controller 14 controls the wireless LAN communication unit 2 and Bluetooth communication unit 3 to be switched to the simultaneous operation, and when the time-division control deciding unit 13 does not decide that the party on the other end is a wireless communication device with a single antenna system, it controls the wireless LAN communication unit 2 and Bluetooth communication unit 3 to be switched to the time-division operation.

Next, the operation will be described.

In the case shown in FIG. 1(*a*), the time-division control deciding unit 13 of the wireless communication device 1 decides from the monitoring result of the timing monitor 12 that the party on the other end is not a wireless communication device with a single antenna system (wireless communication devices 4 and 6 on the other end).

When the time-division control deciding unit 13 decides that the party on the other end is not a wireless communication device with a single antenna system, the time-division controller 14 decides the priority of the wireless LAN packet and that of the Bluetooth packet from the state information or control signal supplied from the wireless LAN communication unit 2 and Bluetooth communication unit 3.

After that, the time-division controller 14 decides which one of the wireless units 20 and 30 is to be operated from the decision result of the priority, and supplies the control signal corresponding to the decision to the communication controllers 21 and 31 to control their operations, thereby carrying out the time-division operation. This enables avoiding the interference between the wireless communications of the wireless LAN and Bluetooth.

In the case shown in FIG. 1(*b*), according to the monitoring result of the timing monitor 12, the time-division control deciding unit 13 of the wireless communication device 1 decides that the party on the other end is a wireless communication device with a single antenna system (party wireless communication device 8 on the other end).

When the time-division control deciding unit 13 decides that the party on the other end is a wireless communication device with a single antenna system, the time-division controller 14 does not carry out the time-division operation, but carries out the simultaneous operation by controlling the wireless LAN communication unit 2 and Bluetooth communication unit 3.

This enables reducing the time that hinders communication because of the ineffective timing control of the wireless LAN due to the time-division operation of the wireless communication device 1, thereby being able to improve the throughput of the wireless LAN.

In addition, when the time-division control deciding unit 13 decides that the party on the other end is a wireless communication device with a single antenna system, the time-division controller 14 does not control the communication timing of the time division in the party wireless communication device on the other end, but adjusts the communication timing of the wireless LAN communication unit 2 and Bluetooth communication unit 3 to the communication timing control of the time division the party wireless communication device on the other end carries out.

Thus, according to the timing control of the time-division operation the party wireless communication device 8 on the other end performs, the wireless communication device 1 can maintain the communication quality.

Incidentally, since the wireless communication device 1 does not control the communication timing of the time division in the party wireless communication device on the other end, it does not execute the following operations.

First, when the time-division control deciding unit 13 decides that the party on the other end is a wireless communication device with a single antenna system, the time-division controller 14 controls the wireless LAN communication unit 2 so as to stop transmitting a CTS (Clear To Send)-to-self packet according to which the party wireless communication device 8 on the other end controls the transmission timing of the wireless LAN packet.

On carrying out the time-division operation, just before the transmitting-receiving timing of a Bluetooth packet, the wireless communication device 1 transmits a CTS-to-self packet to the party on the other end so as to prevent the party on the other end from transmitting a wireless LAN packet, thereby protecting a Bluetooth transmitting-receiving packet.

Thus, when not carrying out the time-division operation, the wireless communication device 1 does not transmit the CTS-to-self packet for controlling the transmission timing of the wireless LAN packet to the party wireless communication device 8 on the other end, but adjusts to the timing control of the time-division operation of the party wireless communication device 8 on the other end.

This makes it possible to prevent transmission of an ineffective CTS-to-self packet, thereby being able to save the time during which communication is disabled owing to the transmission timing control of the wireless LAN by the party on the other end involved in it, and to improve the throughput of the wireless LAN.

In addition, when the time-division control deciding unit 13 decides that the party on the other end is a wireless communication device with a single antenna system, the time-division controller 14 shifts from a power-saving mode to an active mode, and does not transmit to the party on the other end a Ps-Poll (Power saved-Poll) packet or a U-APSD (Unscheduled-Automatic Power Save Delivery) packet, that is, a WMM-PS (WiFi MultiMedia-Power Save) packet.

When shifting from the active mode to the power-saving mode in the time-division operation, the time-division controller 14 transmits a Ps-Poll packet or U-APSD packet to the party on the other end to make a data request to it, thereby controlling the transmission timing of the wireless LAN packet of the party on the other end.

Accordingly, when the wireless communication device 1 does not perform the time-division operation, it stops transmission of a Ps-Poll packet or U-APSD packet for controlling the transmission timing of a wireless LAN packet to the party wireless communication device 8 on the other end, but adjusts to the timing control by the time-division operation of the party wireless communication device 8 on the other end.

This makes it possible to prevent transmission of an ineffective Ps-Poll packet or U-APSD packet, to improve the communication efficiency because of elimination of the time lag due to polling waiting involved with it, and to improve the throughput of the wireless LAN.

As described above, according to the present embodiment 1, it comprises the time-division control deciding unit 13 that decides whether the party on the other end is a wireless communication device with a single antenna system or not; and the time-division controller 14 that controls the wireless LAN communication unit 2 and the Bluetooth communication unit 3 to switch between the simultaneous operation and the time-division operation, the simultaneous operation carrying out the wireless communications through the wireless LAN and Bluetooth in parallel, and the time-division operation carrying out them in time division, wherein when the time-division control deciding unit 13 decides that the party on the other end is a wireless communication device with a single antenna system, the time-division controller 14 controls the wireless LAN communication unit 2 and the Bluetooth communication unit 3 to switch to the simultaneous operation, and when the time-division control deciding unit 13 does not decide that the party on the other end is a wireless communication device with a single antenna system, it controls the wireless LAN communication unit 2 and the Bluetooth communication unit 3 to switch to the time-division operation.

Thus, when carrying out communication with a wireless communication device capable of both the wireless LAN and Bluetooth communication, the wireless communication device decides the antenna system of the party wireless communication device on the other end, and switches between the simultaneous operation and the time-division operation in the dual antenna system in response to the decision result, thereby being able to improve the communication throughput through the wireless LAN.

In addition, according to the present embodiment 1, when the time-division control deciding unit 13 decides that the party on the other end is a wireless communication device with a single antenna system, the time-division controller 14 does not control the communication timing of the time division operation in the party wireless communication device on the other end, but adjusts the communication timing of the wireless LAN communication unit 2 and the Bluetooth communication unit 3 to the communication timing control of the time division operation the party wireless communication device on the other end carries out. By thus doing, the present embodiment 1 can maintain the communication quality according to the timing control of the time-division operation the party wireless communication device on the other end performs.

Furthermore, according to the present embodiment 1, the different wireless communication schemes are a wireless LAN communication scheme and a Bluetooth wireless communication scheme. Accordingly, the present embodiment 1 can adjust to the timing control of the time-division operation of the party wireless communication device on the other end by omitting the above-mentioned individual processing steps executed by the time-division operation of the wireless LAN and Bluetooth.

Incidentally, the present invention is also applicable to different wireless communication schemes other than the wireless LAN and Bluetooth, which bring about the foregoing problem. This makes it possible to improve the throughput of the wireless communication.

Furthermore, according to the present embodiment 1, when the time-division control deciding unit 13 decides that the party on the other end is a wireless communication device with a single antenna system, the time-division controller 14 does not transmit a CTS-to-self packet for controlling the transmission timing of a wireless LAN packet by the party wireless communication device on the other end.

Thus, the present embodiment 1 can prevent the transmission of the ineffective CTS-to-self packet, and can save the time that will disable the communication because of the transmission timing control of the wireless LAN in the party on the other end involved with it, thereby being able to improve the throughput of the wireless LAN.

Furthermore, according to the present embodiment 1, when the time-division control deciding unit 13 decides that the party on the other end is a wireless communication device with a single antenna system, the time-division controller 14 does not transmit a Ps-Poll packet or a U-APSD packet for controlling the transmission timing of a wireless LAN packet by the party wireless communication device on the other end.

This makes it possible to prevent the transmission of an ineffective Ps-Poll packet or U-APSD packet, to eliminate the time lag due to the polling waiting involved with it, and to improve the communication efficiency, thereby being able to improve the throughput of the wireless LAN.

Embodiment 2

The embodiment 2 shows a mode of a deciding method by the time-division control deciding unit 13.

When the party on the other end is a wireless communication device with a single antenna system, the party wireless communication device on the other end carries out the time-division operation of the wireless LAN and Bluetooth.

At this time, a wireless LAN packet the party wireless communication device on the other end transmits has the following feature. Thus the time-division control deciding unit 13 can decide whether the party on the other end is a wireless communication device with a single antenna system or not by detecting the feature.

Figure 3:
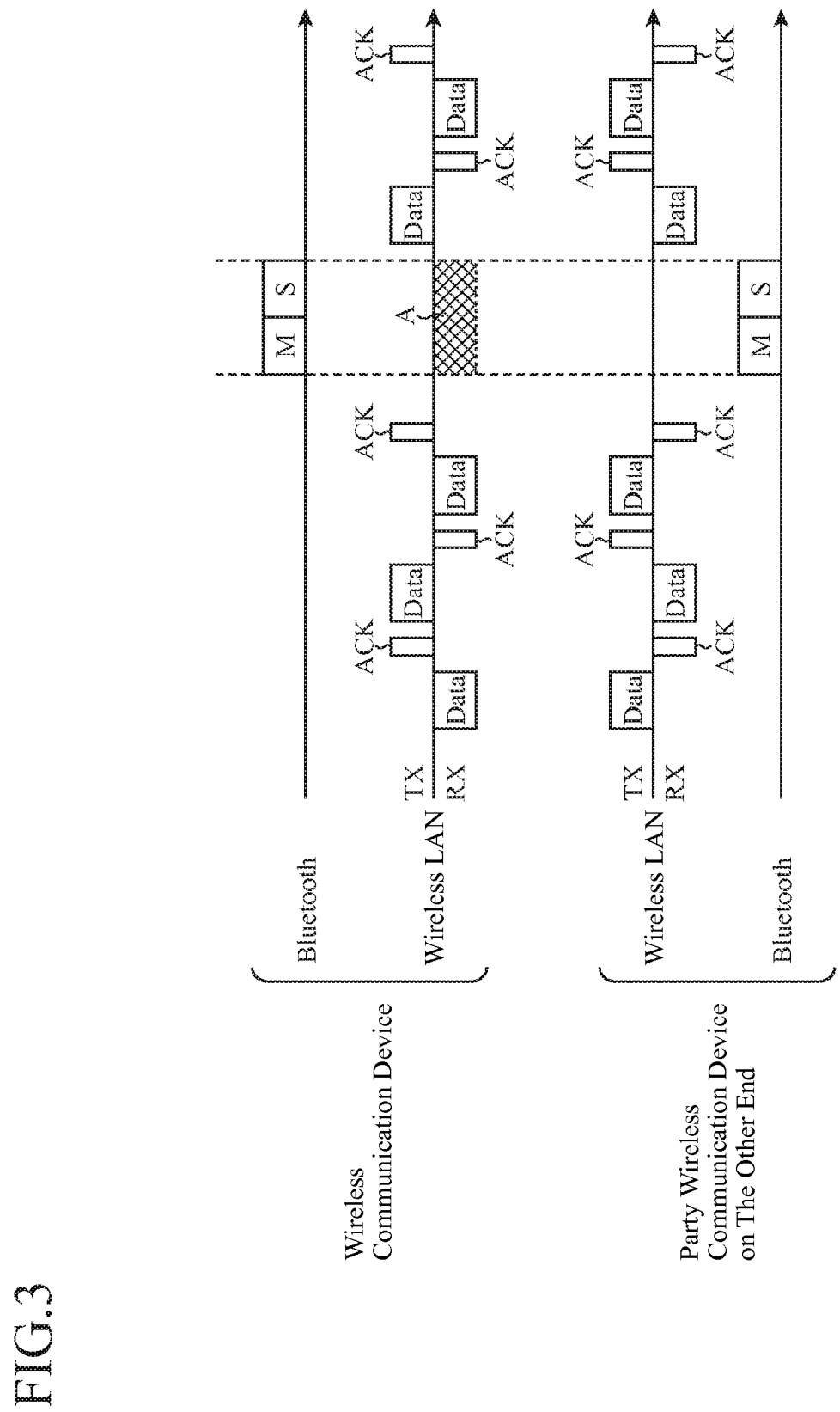
FIG. 3 is a timing chart showing a deciding method of the antenna system of a party wireless communication device on the other end in an embodiment 2 in accordance with the present invention.

FIG. 3 is a timing chart showing a deciding method of the antenna system of the party wireless communication device on the other end in the present embodiment 2 in accordance with the present invention. In FIG. 3, the party on the other end is the party wireless communication device 8 on the other end (see FIG. 1(b)) which is a wireless communication device with a single antenna system.

To carry out the time-division operation, the party wireless communication device 8 on the other end transmits a wireless LAN packet as shown in FIG. 3 to avoid a time period A which is the transmitting-receiving timing of a Bluetooth packet.

Incidentally, as for the transmission according to Bluetooth in FIG. 3, M designates master transmission and S designates slave transmission.

In the wireless communication device 1, the wireless LAN communication unit 2 receives a wireless LAN packet transmitted from the party wireless communication device on the other end (party wireless communication device 8 on the other end). The receiving timing of the wireless LAN packet at this time is supplied from the wireless LAN communication unit 2 to the timing monitor 12 as the timing information.

According to the timing information supplied from the wireless LAN communication unit 2 and Bluetooth communication unit 3, respectively, the timing monitor 12 compares the receiving timing of the wireless LAN packet with the transmitting-receiving timing of a Bluetooth packet in order to monitor as to whether the wireless LAN packet is received during the time period A of the transmitting-receiving timing of a Bluetooth packet (transmitting-receiving time period of the Bluetooth packet) or not.

When the timing monitor 12 decides as shown in FIG. 3 that the receiving timing of a wireless LAN packet does not overlap with the transmitting-receiving timing of Bluetooth, that is, when the wireless LAN packet is not received during the transmitting-receiving time period A of a Bluetooth packet, the time-division control deciding unit 13 decides that the party wireless communication device on the other end is a wireless communication device with a single antenna system that carries out the time-division operation.

Incidentally, to improve the decision accuracy, it is necessary to monitor the receiving timing of wireless LAN packets a plurality of times repeatedly because monitoring at one time only is insufficient.

In addition, to make the decision, it is necessary that both the wireless LAN and Bluetooth are in a communication state, and that packets of both the wireless communication schemes are present.

As for the foregoing decision, although it is made after starting actual communication between the wireless communication devices, it can be made before starting the actual communication by carrying out communication of a dummy packet in advance.

Furthermore, it is also possible to improve the decision accuracy by creating a state of heavy communication traffic.

As described above, according to the present embodiment 2, when a wireless LAN packet transmitted from the party wireless communication device on the other end is not received during the time period of the transmitting-receiving timing of a Bluetooth packet, the time-division control deciding unit 13 decides that the party on the other end is a wireless communication device with a single antenna system. Thus, the present embodiment 2 can decide whether the party on the other end is a wireless communication device with a single antenna system or not appropriately.

Embodiment 3

The embodiment 3 shows a mode of a deciding method by the time-division control deciding unit 13.

When the party on the other end is a wireless communication device with a single antenna system, the party wireless communication device on the other end performs a time-division operation of the wireless LAN and Bluetooth.

At this time, a wireless LAN packet the party wireless communication device on the other end transmits has the following feature. Thus the time-division control deciding unit 13 can decide whether the party on the other end is a wireless communication device with a single antenna system or not by detecting the feature.

Figure 4:
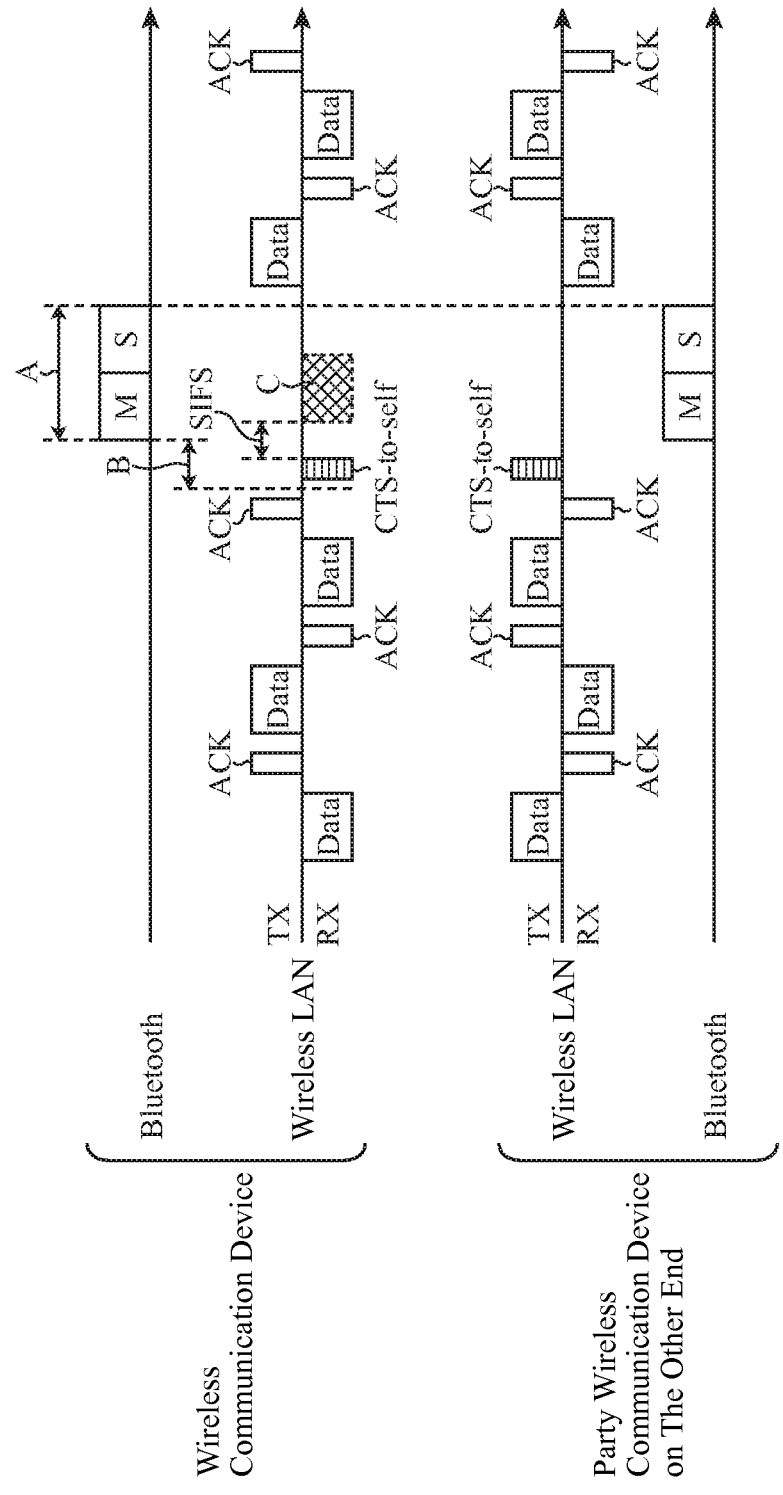
FIG. 4 is a timing chart showing a deciding method of the antenna system of a party wireless communication device on the other end in an embodiment 3 in accordance with the present invention.

FIG. 4 is a timing chart showing a deciding method of the antenna system of the party wireless communication device on the other end in the present embodiment 3 in accordance with the present invention. In FIG. 4, the party on the other end is the party wireless communication device 8 on the other end (see FIG. 1(b)) which is a wireless communication device with a single antenna system.

Incidentally, as for the transmission according to Bluetooth in FIG. 4, M designates master transmission and S designates slave transmission.

To carry out the time-division operation, the party wireless communication device 8 on the other end transmits a CTS-to-self packet before the time period of the transmitting-receiving timing of a Bluetooth packet, that is, during a period B just before the transmitting-receiving time period A of the Bluetooth packet in order to stop the transmission of a wireless LAN packet from the party on the other end (wireless communication device 1) during the transmitting-receiving time period of a Bluetooth packet as shown in FIG. 4, and after the SIFS (Short InterFrame Space) time has elapsed, it does not transmit a wireless LAN data packet to relinquish the time period to Bluetooth.

In the wireless communication device 1, the wireless LAN communication unit 2 receives a wireless LAN packet transmitted from the party wireless communication device on the other end (party wireless communication device 8 on the other end). At this time, the signal detector 210 extracts the CTS-to-self packet from the wireless LAN packet received by the wireless unit 20, and outputs the timing information indicating the receiving timing to the timing monitor 12.

According to the timing information supplied from the wireless LAN communication unit 2 and Bluetooth communication unit 3, respectively, the timing monitor 12 compares the receiving timing of the CTS-to-self packet with the transmitting-receiving timing of the Bluetooth packet to monitor as to whether the CTS-to-self packet is received during the period B just before the transmitting-receiving time period A of the Bluetooth packet, and whether a wireless LAN data packet (Data) is received during the period C after the SIFS time period has elapsed.

The time-division control deciding unit 13 decides that the party on the other end is a wireless communication device with a single antenna system if the timing monitor 12 receives the CTS-to-self packet transmitted from the party wireless communication device on the other end during the time period (period B) before the transmitting-receiving timing of a Bluetooth packet as shown in FIG. 4, but does not receive a wireless LAN data packet during the period C after its SIFS has elapsed.

Incidentally, to improve the decision accuracy, it is necessary to monitor the receiving timing of wireless LAN packets a plurality of times repeatedly because monitoring at one time only is insufficient.

In addition, to make the decision, it is necessary that both the wireless LAN and Bluetooth are in a communication state, and that packets of both the wireless communication schemes are present.

As for the foregoing decision, although it is made after starting actual communication between the wireless communication devices, it can be made before starting the actual communication by carrying out communication of a dummy packet in advance.

Furthermore, it is also possible to improve the decision accuracy by creating a state of heavy communication traffic.

As described above, according to the present embodiment 3, when the CTS-to-self packet transmitted from the party wireless communication device on the other end is received before a time period of the transmitting-receiving timing of a Bluetooth packet, and when the wireless LAN data packet is not received even after its SIFS has elapsed, the time-division control deciding unit 13 decides that the party on the other end is a wireless communication device with a single antenna system. Thus, the present embodiment 3 can also decide whether the party on the other end is a wireless communication device with a single antenna system or not appropriately.

Embodiment 4

The embodiment 4 shows a mode of a deciding method by the time-division control deciding unit 13.

When the party on the other end is a wireless communication device with a single antenna system, the party wireless communication device on the other end performs a time-division operation of a wireless LAN and Bluetooth.

At this time, a wireless LAN packet the party wireless communication device on the other end transmits has the following feature. Thus the time-division control deciding unit 13 can decide whether the party on the other end is a wireless communication device with a single antenna system or not by detecting the feature.

Figure 5:
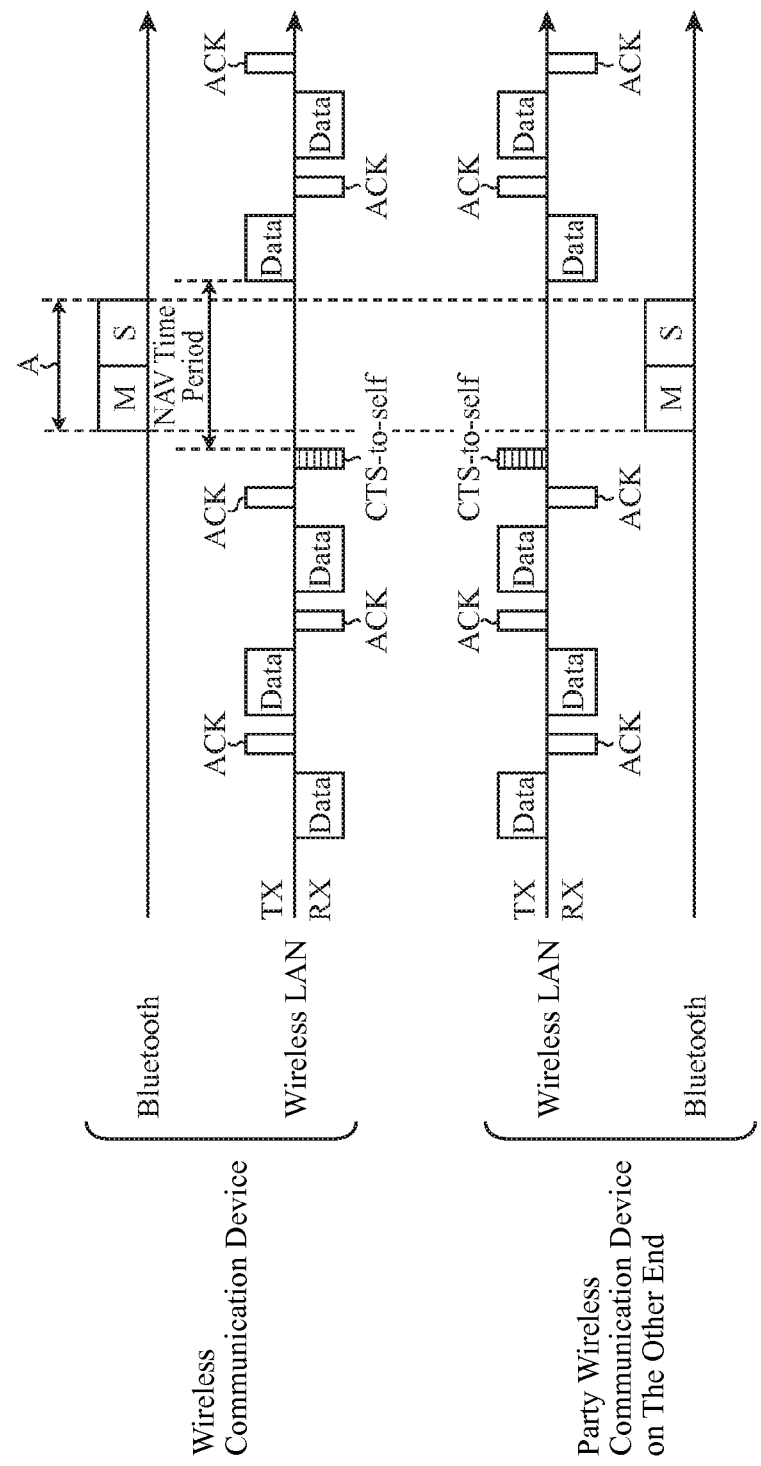
FIG. 5 is a timing chart showing a deciding method of the antenna system of a party wireless communication device on the other end in an embodiment 4 in accordance with the present invention.

FIG. 5 is a timing chart showing a deciding method of the antenna system of the party wireless communication device on the other end in the present embodiment 4 in accordance with the present invention 2. In FIG. 5, the party on the other end is the party wireless communication device 8 on the other end (see FIG. 1(b)) which is a wireless communication device with a single antenna system.

Incidentally, as for the transmission according to Bluetooth in FIG. 5, M designates master transmission and S designates slave transmission.

To stop the transmission of a wireless LAN packet from the party on the other end (wireless communication device 1) during the transmitting-receiving time period of a Bluetooth packet in order to carry out the time-division operation, the party wireless communication device 8 on the other end sets, as an NAV (Network Allocation Vector) time period based on a duration value of the CTS-to-self packet, a time period which follows the CTS-to-self packet and contains the transmitting-receiving time period A of the Bluetooth as shown in FIG. 5.

In the wireless communication device 1, the wireless LAN communication unit 2 receives the wireless LAN packet transmitted from the party wireless communication device on the other end (party wireless communication device 8 on the other end). At this time, the signal detector 210 extracts the CTS-to-self packet from the wireless LAN packet received by the wireless unit 20, further extracts the NAV time period based on the duration value from the CTS-to-self packet, and outputs it to the timing monitor 12 as the timing information.

According to the timing information supplied from the wireless LAN communication unit 2 and Bluetooth communication unit 3, respectively, the timing monitor 12 compares the NAV time period based on the duration value of the CTS-to-self packet with the transmitting-receiving time period A of a Bluetooth packet following it to monitor as to whether the NAV time period based on the duration value contains the Bluetooth packet transmitting-receiving time period A or not.

When the timing monitor 12 decides that the NAV time period based on the duration value of the CTS-to-self packet transmitted from the party wireless communication device on the other end contains the Bluetooth packet transmitting-receiving time period A as shown in FIG. 5, the time-division control deciding unit 13 decides that the party on the other end is a wireless communication device with a single antenna system.

Incidentally, to improve the decision accuracy, it is necessary to monitor the receiving timing of wireless LAN packets a plurality of times repeatedly because monitoring at one time only is insufficient.

In addition, to make the decision, it is necessary that both the wireless LAN and Bluetooth are in a communication state, and that packets of both the wireless communication schemes are present.

As for the foregoing decision, although it is made after starting actual communication between the wireless communication devices, it can be made before starting the actual communication by carrying out communication of a dummy packet in advance.

Furthermore, it is also possible to improve the decision accuracy by creating a state of heavy communication traffic.

As described above, according to the present embodiment 4, when the NAV time period based on the duration value of the CTS-to-self packet transmitted from the party wireless communication device on the other end includes the time period of the transmitting-receiving timing of a Bluetooth packet following the CTS-to-self packet, the time-division control deciding unit 13 decides that the party on the other end is a wireless communication device with a single antenna system. Thus, the present embodiment 4 can also decides appropriately whether the party on the other end is a wireless communication device with a single antenna system or not.

Embodiment 5

The embodiment 5 shows a mode of a deciding method by the time-division control deciding unit 13.

When the party on the other end is a wireless communication device with a single antenna system, the party wireless communication device on the other end carries out the time-division operation of the wireless LAN and Bluetooth.

At this time, a wireless LAN packet the party wireless communication device on the other end transmits has the following feature. Thus the time-division control deciding unit 13 can decide whether the party on the other end is a wireless communication device with a single antenna system or not by detecting the feature.

Figure 6:
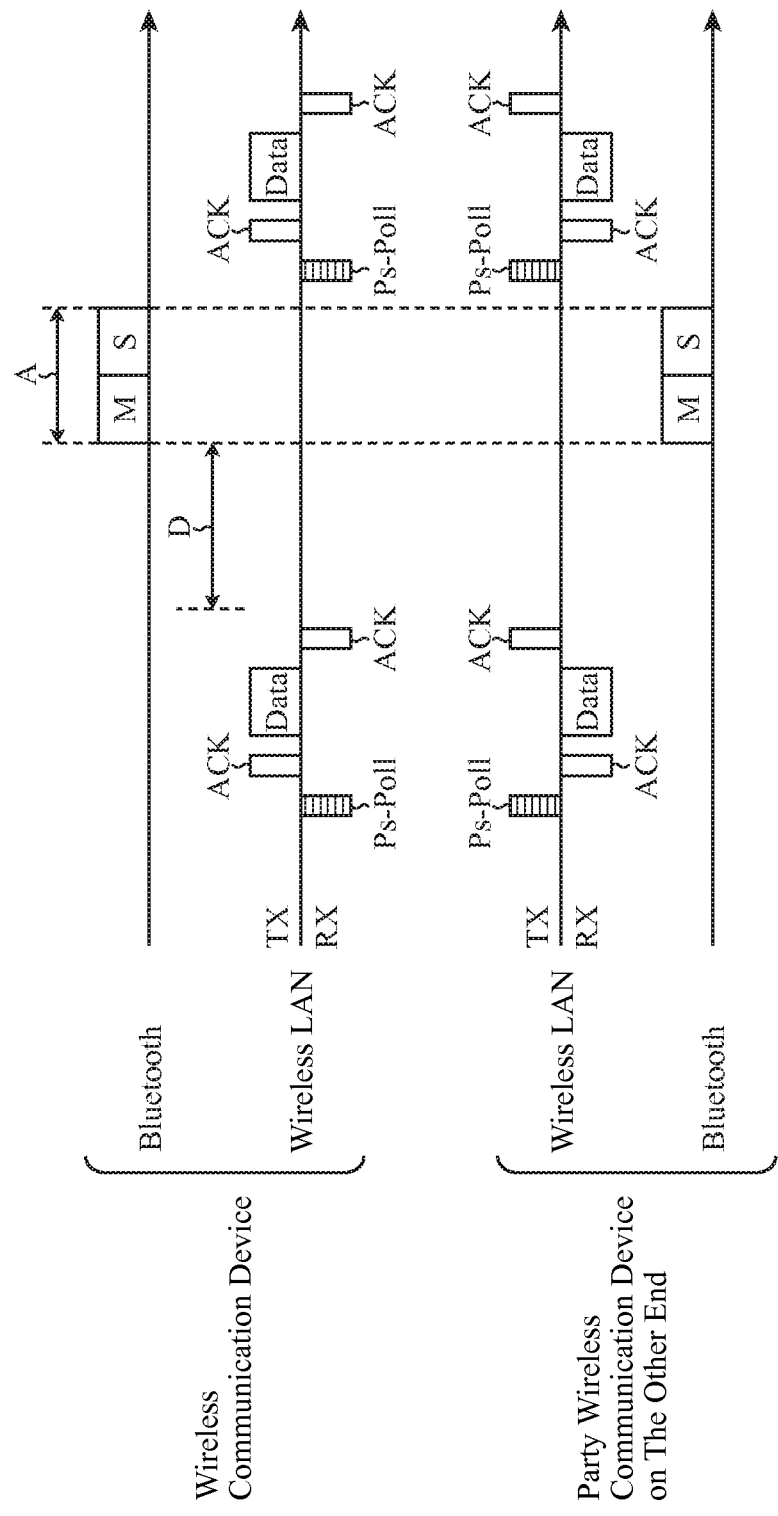
FIG. 6 is a timing chart showing a deciding method of the antenna system of a party wireless communication device on the other end in an embodiment 5 in accordance with the present invention.

FIG. 6 is a timing chart showing a deciding method of the antenna system of the party wireless communication device on the other end in the present embodiment 5 in accordance with the present invention 2. In FIG. 6, the party on the other end is the party wireless communication device 8 on the other end (see FIG. 1(b)) which is a wireless communication device with a single antenna system.

Incidentally, as for the transmission according to Bluetooth in FIG. 6, M designates master transmission and S designates slave transmission.

When the party wireless communication device 8 on the other end is an STA (station), it performs a polling operation by transmitting a Ps-Poll packet or U-APSD (WMM-PS) packet, and acquires wireless LAN data (Data) from the party on the other end (wireless communication device 1).

Thus, as shown in FIG. 6, the party wireless communication device 8 on the other end controls in such a manner that the transmission timing of the wireless LAN packet from the party on the other end (wireless communication device 1) does not overlap with the transmitting-receiving time period of a Bluetooth packet.

To achieve this, a Ps-Poll packet or U-APSD (WMM-PS) packet is not transmitted during a time period D before the time period of the transmitting-receiving timing of a Bluetooth packet (transmitting-receiving time period A) as shown in FIG. 6.

In the wireless communication device 1, the wireless LAN communication unit 2 receives the wireless LAN packet transmitted from the party wireless communication device on the other end (party wireless communication device 8 on the other end). At this time, the signal detector 210 extracts the Ps-Poll packet or U-APSD (WMM-PS) packet from the wireless LAN packet received by the wireless unit 20, and outputs the timing information indicating the timing of its reception to the timing monitor 12.

According to the timing information supplied from the wireless LAN communication unit 2 and Bluetooth communication unit 3, respectively, the timing monitor 12 compares the receiving timing of the Ps-Poll packet or U-APSD packet with the transmitting-receiving timing of a Bluetooth packet to monitor whether the Ps-Poll packet or U-APSD (WMM-PS) packet is received before the time period of the transmitting-receiving timing of a Bluetooth packet, that is, during the time period D before the transmitting-receiving time period A.

When the timing monitor 12 decides that the Ps-Poll packet or U-APSD (WMM-PS) packet is not received during the time period D as shown in FIG. 6, the time-division control deciding unit 13 decides that the party on the other end is a wireless communication device with a single antenna system.

Incidentally, to improve the decision accuracy, it is necessary to monitor the receiving timing of wireless LAN packets a plurality of times repeatedly because monitoring at one time only is insufficient.

In addition, to make the decision, it is necessary that both the wireless LAN and Bluetooth are in a communication state, and that packets of both the wireless communication schemes are present.

As for the foregoing decision, although it is made after starting actual communication between the wireless communication devices, it can be made before starting the actual communication by carrying out communication of a dummy packet in advance.

Furthermore, it is also possible to improve the decision accuracy by creating a state of heavy communication traffic.

As described above, according to the present embodiment 5, the time-division control deciding unit 13 decides that the party on the other end is a wireless communication device with a single antenna system when the Ps-Poll packet or U-APSD (WMM-PS) packet transmitted from the party wireless communication device on the other end is not received before each time period of the transmitting-receiving timing of a Bluetooth packet.

Thus, the present embodiment 5 can also appropriately decide whether the party on the other end is a wireless communication device with a single antenna system or not.

Incidentally, it is to be understood that a free combination of the individual embodiments, variations of any components of the individual embodiments or removal of any components of the individual embodiments is possible within the scope of the present invention.

INDUSTRIAL APPLICABILITY

A wireless communication device in accordance with the present invention can improve the throughput of the wireless communication even when the party on the other end is a wireless communication device with a single antenna system. Accordingly, it is suitable for a navigation system that is likely to carry out communication with a wireless communication device with a single antenna system such as a smartphone in a vehicle, for example.

DESCRIPTION OF REFERENCE SYMBOLS 1 wireless communication device; 2, 5, 9 wireless LAN communication unit; 2a, 3a, 5a, 7a, 11a antenna; 3, 7, 10 Bluetooth communication unit; 4, 6, 8 party wireless communication device on the other end; 11 antenna switch; 12 timing monitor; 13 time-division control deciding unit; 14 time-division controller; 20, 30 wireless unit; 21, 31 communication controller; 210 signal detector.

What is claimed is:

1. A wireless communication device including wireless communicators each carrying out wireless communication using different wireless communication schemes through antennas independent of each other, the wireless communication device comprising:

a decider monitoring the signals received by the wireless communicators to decide whether or not a party on the other end is a wireless communication device with a single antenna system which carries out wireless communication in time division using the different wireless communication schemes through a common antenna; and a controller to control the individual wireless communicators, and switch between a simultaneous operation and a time-division operation by the wireless communicators using different wireless communication schemes, the simultaneous operation by the wireless communicators carrying out wireless communication using the different wireless communication schemes in parallel, and the time-division operation by the wireless communicators carrying out the wireless communication using the different wireless communication schemes in time division, wherein when the decider decides that the party on the other end is the wireless communication device with the single antenna system, the controller switches to the simultaneous operation by controlling the individual wireless communicators, and when the decider does not decide that the party on the other end is the wireless communication device with the single antenna system, the controller switches to the time-division operation by controlling the individual wireless communicators.

2. The wireless communication device according to claim 1, wherein
when the decider decides that the party on the other end is the wireless communication device with the single antenna system, the controller does not control communication timing of the time division in the party wireless communication device on the other end, but adjusts communication timing of the wireless communicators to communication timing control of the time division the party wireless communication device on the other end carries out.

3. The wireless communication device according to claim 2, wherein the different wireless communication schemes are a wireless communication scheme of a Wireless LAN (Local Area Network) and a wireless communication scheme of Bluetooth (registered trademark).

4. The wireless communication device according to claim 3, wherein when the decider decides that the party on the other end is the wireless communication device with the single antenna system, the controller does not transmit a CTS (Clear To Send)-to-self packet for controlling transmission timing of a Wireless LAN packet by the party wireless communication device on the other end.

5. The wireless communication device according to claim 3, wherein when the decider decides that the party on the other end is the wireless communication device with the single antenna system, the controller does not transmit a Ps-Poll (Power saved-Poll) packet or U-APSD (Unscheduled-Automatic Power Save Delivery) packet for controlling the transmission timing of a Wireless LAN packet by the party wireless communication device on the other end.

6. The wireless communication device according to claim 3, wherein the decider decides that the party on the other end is the wireless communication device with the single antenna system when a Wireless LAN packet transmitted from the party wireless communication device on the other end is not received during a time period of transmitting-receiving timing of a Bluetooth packet.

7. The wireless communication device according to claim 3, wherein the decider decides that the party on the other end is the wireless communication device with the single antenna system when a CTS-to-self packet transmitted from the party wireless communication device on the other end is received before a time period of transmitting-receiving timing of a Bluetooth packet and when a Wireless LAN data packet is not received even after its SIFS (Short InterFrame Space) has elapsed.

8. The wireless communication device according to claim 3, wherein the decider decides that the party on the other end is the wireless communication device with the single antenna system when an NAV (Network Allocation Vector) time period based on a duration value of a CTS-to-self packet transmitted from the party wireless communication device on the other end includes a time period of transmitting-receiving timing of a Bluetooth packet following the CTS-to-self packet.

9. The wireless communication device according to claim 3, wherein the decider decides that the party on the other end is the wireless communication device with the single antenna system when a Ps-Poll packet or U-APSD packet transmitted from the party wireless communication device on the other end is not received before each time period of transmitting-receiving timing of a Bluetooth packet.

10. A wireless communication control method executed by a wireless communication device including wireless communicators each carrying out wireless communication using different wireless communication schemes through antennas independent of each other, the wireless communication control method comprising the steps of:
deciding by a decider whether or not a party on the other end is a wireless communication device with a single antenna system which carries out wireless communication in time division using the different wireless communication schemes through a common antenna; and
switching by the controller to a simultaneous operation by said wireless communicators using different wireless communication schemes that carries out wireless communications by controlling the individual wireless communicators when the decider decides that the party on the other end is the wireless communication device with the single antenna system, and switching to a time-division operation that carries out the wireless communications by said wireless communicators using the different wireless communication schemes in time division by controlling the individual wireless communicators when the decider does not decide that the party on the other end is the wireless communication device with the single antenna system.

* * * * *